US008827856B1

(12) United States Patent
Younggren et al.

(10) Patent No.: US 8,827,856 B1
(45) Date of Patent: Sep. 9, 2014

(54) INFINITELY VARIABLE TRANSMISSION WITH AN IVT STATOR CONTROLLING ASSEMBLY

(71) Applicant: TEAM Industries, Inc., Bagley, MN (US)

(72) Inventors: Bruce H. Younggren, Bemidji, MN (US); John E. Hamrin, Bemidji, MN (US); Joel Dunlap, Bemidji, MN (US)

(73) Assignee: TEAM Industries, Inc., Bagley, MN (US)

( * ) Notice: Subject to any disclaimer, the term of this patent is extended or adjusted under 35 U.S.C. 154(b) by 0 days.

(21) Appl. No.: 13/828,046

(22) Filed: Mar. 14, 2013

(51) Int. Cl.
*F16H 15/48* (2006.01)
*F16H 59/36* (2006.01)
*F16H 61/664* (2006.01)

(52) U.S. Cl.
CPC .................................. *F16H 61/6647* (2013.01)
USPC ............................................... 475/186; 476/5

(58) Field of Classification Search
USPC ........................................................ 475/186
See application file for complete search history.

(56) References Cited

U.S. PATENT DOCUMENTS

| 2,526,435 | A | | 10/1950 | Teigman |
|---|---|---|---|---|
| 2,727,396 | A | | 12/1955 | Haugwitz |
| 4,270,415 | A | | 6/1981 | Dickinson et al. |
| 4,345,486 | A | | 8/1982 | Olesen |
| 4,391,156 | A | * | 7/1983 | Tibbals, Jr. ................. 74/336.5 |
| 6,120,399 | A | | 9/2000 | Okeson et al. |
| 6,322,475 | B2 | * | 11/2001 | Miller ............................... 476/5 |
| 6,569,043 | B2 | | 5/2003 | Younggren et al. |
| 6,733,406 | B2 | * | 5/2004 | Kitai et al. ....................... 474/13 |
| 6,813,553 | B2 | | 11/2004 | Nakamura et al. |
| 7,074,154 | B2 | * | 7/2006 | Miller ............................... 476/37 |
| 7,204,777 | B2 | | 4/2007 | Miller et al. |
| 7,581,467 | B2 | | 9/2009 | Peterman et al. |
| 7,727,106 | B2 | * | 6/2010 | Maheu et al. ..................... 476/1 |
| 7,762,919 | B2 | | 7/2010 | Smithson et al. |
| 7,762,920 | B2 | | 7/2010 | Smithson et al. |
| 7,770,674 | B2 | | 8/2010 | Miles et al. |
| 7,963,880 | B2 | | 6/2011 | Smithson et al. |

(Continued)

FOREIGN PATENT DOCUMENTS

WO    WO 02/88573  A2    11/2002

OTHER PUBLICATIONS

Model N360 NuVinci® CVP, Bicycle Drivetrain. Fallbrook Technologies Inc. 2010, 2 pages.

(Continued)

*Primary Examiner* — Dirk Wright
(74) *Attorney, Agent, or Firm* — IPLM Group, P.A.

(57) ABSTRACT

An infinitely variable transmission is provided. The transmission includes an input assembly that is coupled to receive input rotational motion and an output assembly that is rotationally coupled to a load. An input/output planetary ratio assembly sets an input to output speed ratio. The input/output planetary ratio assembly has a first stator and a second stator. An input speed feedback control assembly is operationally attached to the input assembly. The input speed feedback control assembly includes a spider that is coupled to one of the first stator and the second stator. A movable member is operationally engaged with the spider with at least one shift weight. The moveable member is further operationally coupled to the other of the first stator and second stator. Moreover a torque feedback control assembly applies an axial load force in response to a torque of a load to the input speed control assembly.

20 Claims, 14 Drawing Sheets

(56) References Cited

U.S. PATENT DOCUMENTS

| | | | |
|---|---|---|---|
| 7,976,426 B2 | 7/2011 | Smithson et al. | |
| 8,087,482 B2 | 1/2012 | Miles et al. | |
| 8,360,917 B2 | 1/2013 | Nichols et al. | |
| 8,496,551 B2 | 7/2013 | Mueller et al. | |
| 8,585,528 B2* | 11/2013 | Carter et al. | 475/192 |
| 8,668,623 B2* | 3/2014 | Vuksa et al. | 477/80 |
| 2002/0123400 A1* | 9/2002 | Younggren et al. | 474/14 |
| 2004/0171452 A1 | 9/2004 | Miller et al. | |
| 2007/0270265 A1 | 11/2007 | Miller et al. | |
| 2007/0270267 A1 | 11/2007 | Miller et al. | |
| 2007/0270272 A1 | 11/2007 | Miller et al. | |
| 2007/0270278 A1 | 11/2007 | Miller et al. | |
| 2009/0164076 A1 | 6/2009 | Vasiliotis et al. | |
| 2010/0056322 A1 | 3/2010 | Thomassy | |
| 2010/0093480 A1 | 4/2010 | Pohl et al. | |
| 2010/0267510 A1 | 10/2010 | Nichols et al. | |
| 2010/0314184 A1 | 12/2010 | Stenberg et al. | |
| 2011/0034284 A1 | 2/2011 | Pohl et al. | |
| 2011/0088503 A1 | 4/2011 | Armstrong et al. | |
| 2011/0092325 A1 | 4/2011 | Vuksa et al. | |
| 2011/0172050 A1 | 7/2011 | Nichols et al. | |
| 2011/0220453 A1 | 9/2011 | Mueller et al. | |
| 2012/0115667 A1 | 5/2012 | Lohr et al. | |
| 2012/0238386 A1 | 9/2012 | Pohl et al. | |

OTHER PUBLICATIONS

NuVinci Deltaseries Supercharger Drive. Fallbrook Technologies Inc. 2012, 2 pages.

NuVinci® N360 CVP Drivetrain Owner's Manual. Fallbrook Technologies Inc. Jul. 2010, 6 pages.

NuVinci® Parts Catalog, NuVinci N360 and NuVinci Harmony Parts Catalog - *B35-N360-12* Fallbrook Technologies Inc. 2012, 11 pages.

NuVinci® N360 Technical Manual. *B35-N360-02* Fallbrook Technologies Inc. 2012, 15 pages.

NuVinci® N360 Test Summary. Fallbrook Technologies Inc. 2010, 1 page.

NuVinci® Range and Gear Inch Comparison, NuVinci N360. Date unknown. 1 page.

Pohl, Brad, et al. "Configuration Analysis of a Spherical Traction Drive CVT/IVT". Fallbrook Technologies. Date unknown, 6 pages.

Non-Final Office Action of Corresponding U.S. Appl. No. 13/828,902 mailed on Feb. 26, 2014.

Non-Final Office Action of Corresponding U.S. Appl. No. 13/804,287 mailed on Mar. 13, 2014.

Final Office Action, U.S. Appl. No. 13/804,287 mailed Jun. 30, 2014.

Search Report/Written Opinion of International Application Serial No. PCT/US2014/021861 mailed Jun. 4, 2014.

* cited by examiner

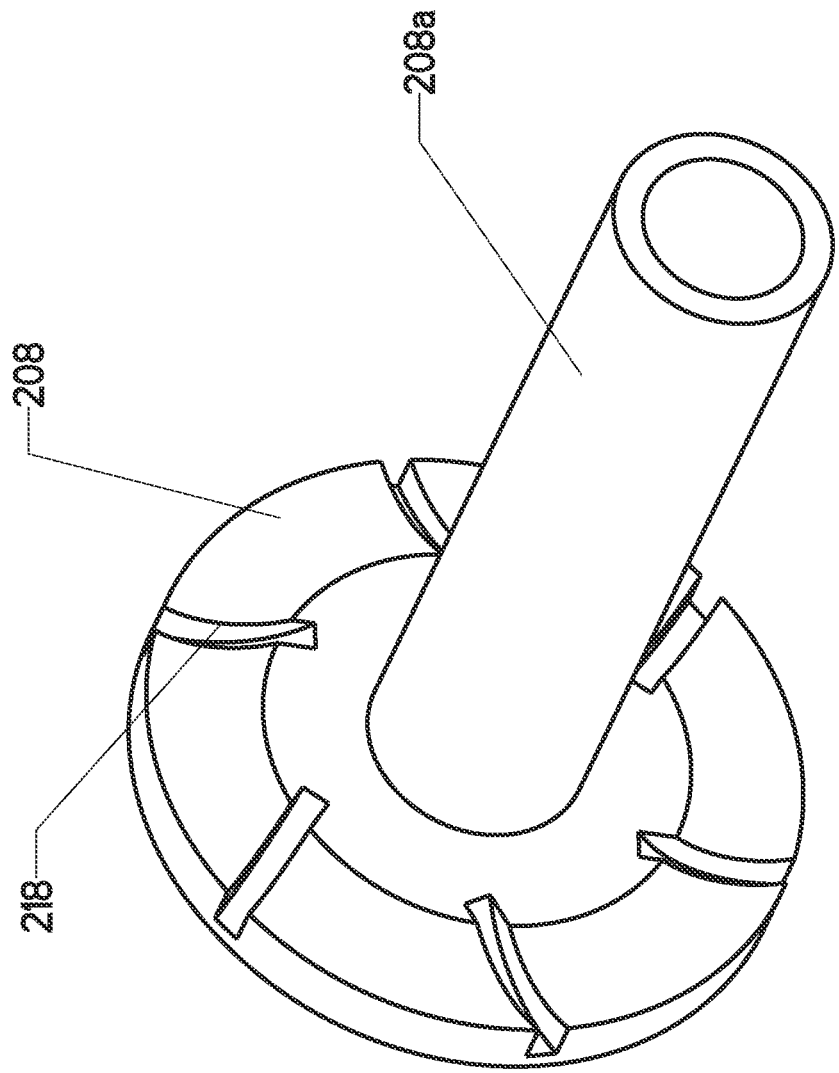

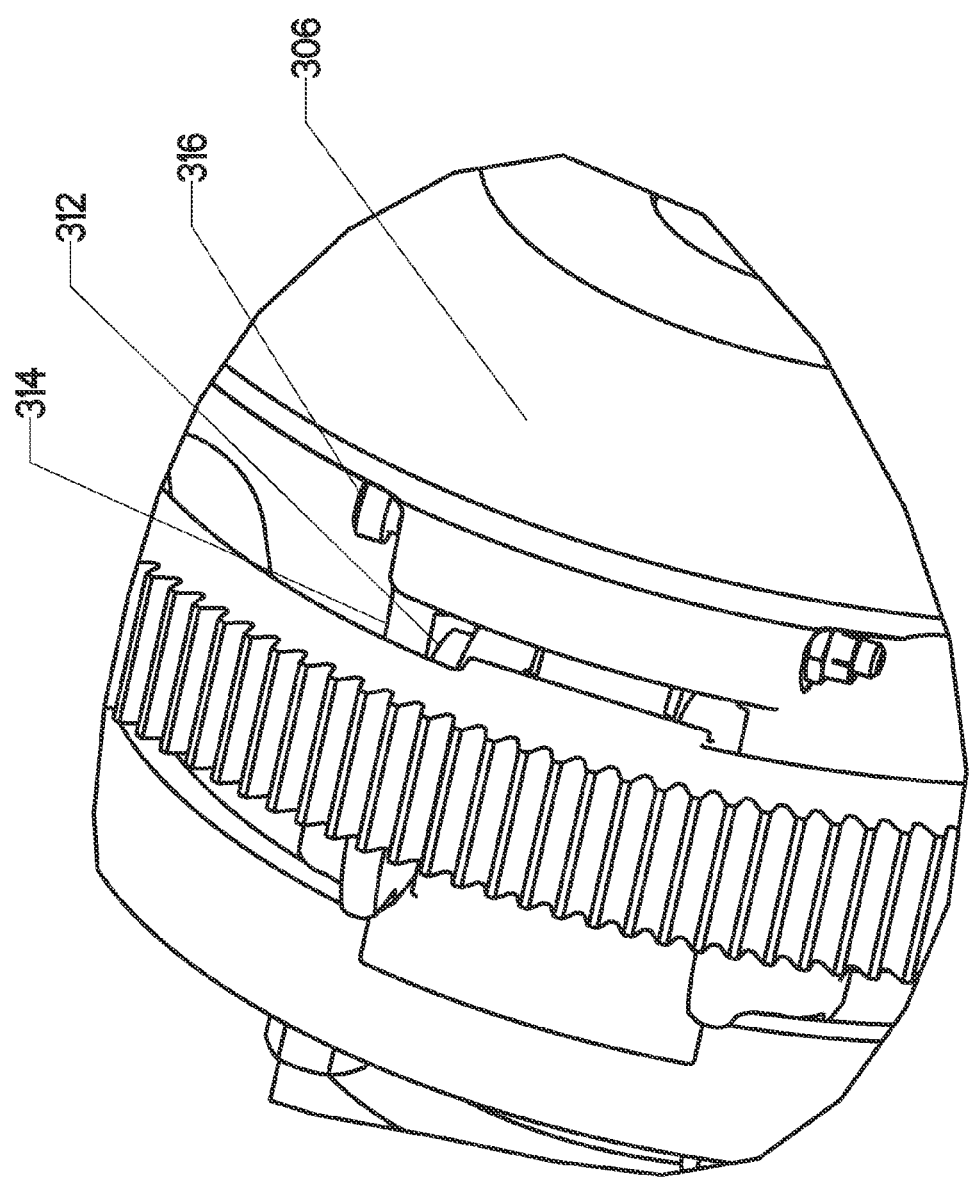

INFINITELY VARIABLE TRANSMISSION WITH AN IVT STATOR CONTROLLING ASSEMBLY

BACKGROUND

An infinitely variable transmission (IVT) is a transmission that continuously varies a speed ratio between an input speed and an output speed. An IVT can vary the input to output speed ratio from essentially an infinite value (neutral) to a finite value. This infinite speed ratio condition is sometimes known as a geared neutral. A subset of an IVT is a continuously variable transmission (CVT) that does not have a geared neutral. One type of IVT is a spherical-type that utilizes spherical speed adjusters, such as power adjusters, balls, planets, spherical gears or rollers. The spherical speed adjustors in this embodiment have tiltable axis of rotation that are adapted to be adjusted to achieve a desired ratio of input speed to output speed.

For the reasons stated above and for other reasons stated below which will become apparent to those skilled in the art upon reading and understanding the present specification, there is a need in the art for an effective an efficient method of controlling the variable shifting of an IVT.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, an infinitely variable transmission is provided that includes an input assembly, an output assembly, an input/output planetary ratio assembly, an input speed feedback control assembly and a torque feedback control assembly. The input assembly is configured to be coupled to receive input rotational motion. The output assembly provides a rotational output and is rotationally coupled to a load. The input/output planetary ratio assembly is configured and arranged to set an input to output speed ratio. The input/output planetary ratio assembly has a first stator and a second stator. The input speed feedback control assembly is operationally attached to the input assembly. The input speed feedback control assembly includes a spider that is coupled to one of the first stator and the second stator. The movable member is operationally engaged with the spider with at least one shift weight. The moveable member is further operationally coupled to the other of the first stator and second stator. A torque feedback control assembly is configured and arranged to apply an axial load force in response to a torque of a load to the input speed control assembly.

In another embodiment, another infinitely variable transmission is provided. This, infinitely variable transmission includes an input assembly, an output assembly, an input/output planetary ratio assembly and an input speed feedback control assembly. The input assembly is configured to be coupled to receive input rotational motion. The output assembly is used to provide a rotational output. Moreover, the output assembly is configured to be rotationally coupled to a load. The input/output planetary ratio assembly is configured and arranged to set an input to output speed ratio. The input/output planetary ratio assembly has a first stator and a second stator. A first stator shaft centrally extends from the first stator and a second stator shaft centrally extends from the second stator. The second shaft has a track. The first shaft is received within the second shaft. The input speed feedback control assembly is operationally attached to the input assembly. The input speed feedback control assembly includes a spider and a moveable member. The first shaft of the first stator is rigidly coupled to the spider. The movable member is operationally engaged with the spider with at least one shift weight. A pin is coupled to the movable member. The pin is in turn received within the track in the second stator shaft.

In still another embodiment, another infinitely variable transmission is provided. This infinitely variable transmission includes an input assembly, an output assembly, an input/output planetary ratio assembly, an input speed feedback control assembly and a torque feedback control assembly. The input assembly is configured to be coupled to receive input rotational motion. The output assembly is used to provide a rotational output. The output assembly is configured to be rotationally coupled to a load. The input/output planetary ratio assembly is configured and arranged to set an input to output speed ratio. The input/output planetary ratio assembly has a first stator and a second stator. A first stator shaft centrally extends from the first stator and a second stator shaft centrally extends from the second stator. The second shaft has a track. The first shaft is received within the second shaft. The input speed feedback control assembly is operationally attached to the input assembly. The input speed feedback control assembly includes a spider and a movable member. The first shaft of the first stator is rigidly coupled to the spider. The movable member is operationally engaged with the spider with at least one shift weight. Moreover, a pin is coupled to the movable member. The pin is received within the track in the second stator shaft. The torque feedback control assembly is configured and arranged to apply an axial load force in response to a torque of a load to the input speed control assembly.

BRIEF DESCRIPTION OF THE DRAWINGS

The present invention can be more easily understood and further advantages and uses thereof will be more readily apparent, when considered in view of the detailed description and the following figures in which:

FIG. 2C is a front perspective view of a first stator of the input/output planetary ratio assembly of FIG. 2B;

FIG. 3B is a perspective view of a portion of the input speed feedback control assembly of FIG. 3A;

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Figure 1:
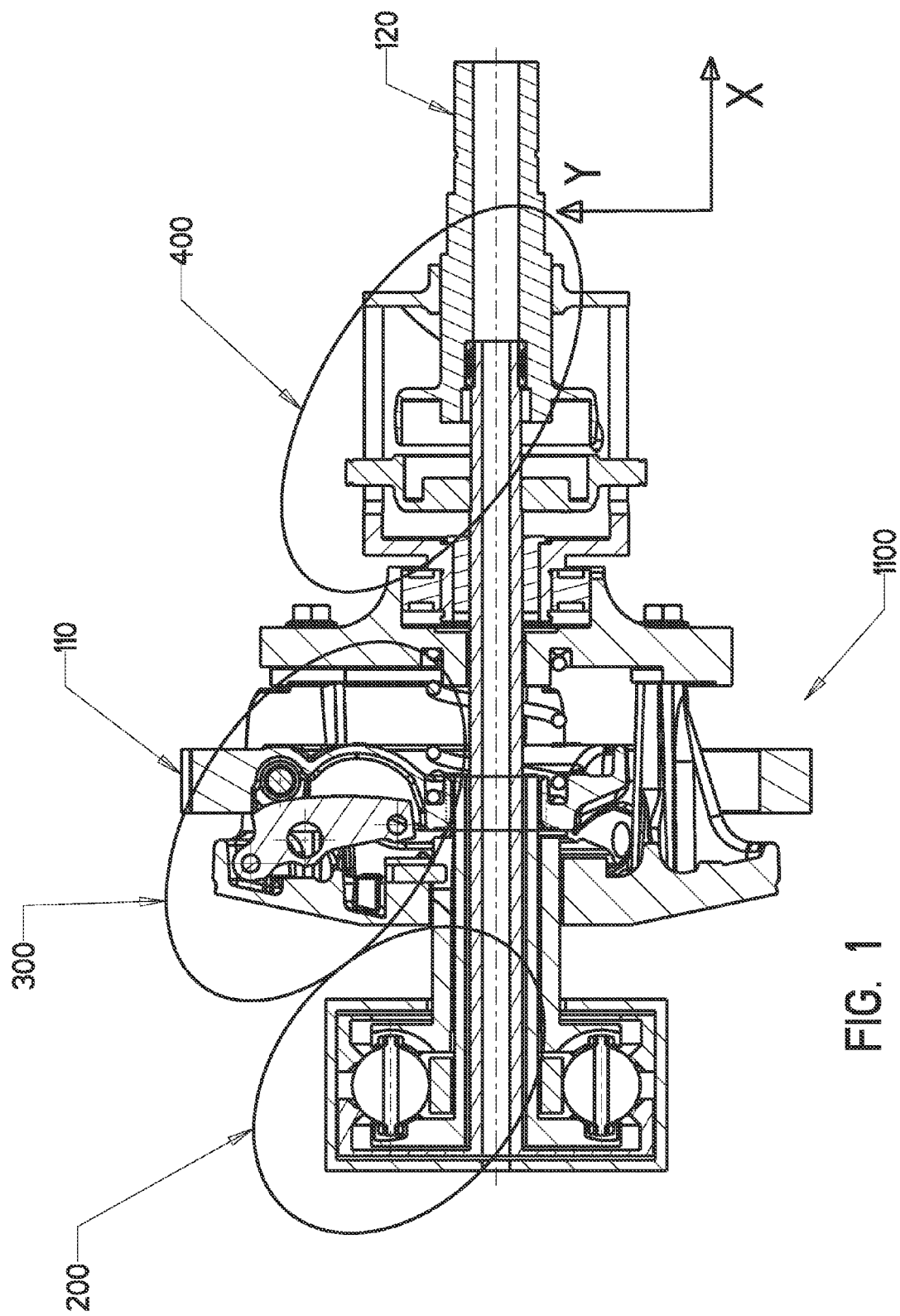
FIG. 1 is a cross-sectional diagram of an infinitely continuously variable transmission (WT) of one embodiment of the present invention.

Embodiments of the present invention provide an infinitely variable transmission (IVT) 1100 that includes a novel shifting mechanism. A cross-sectional side view of the IVT 1100 is illustrated in FIG. 1. The IVT 1100 of this embodiment is also known as an infinitely variable planetary. Elements of the IVT 1100 include an input assembly 110 which is connected directly or indirectly to a crankshaft of an engine to receive rotational motion. The IVT 1100 also includes an output assembly 120 that is connected directly or indirectly to a load, such as, tires of a vehicle. Input speed feedback control assembly 300 includes part of a shifting mechanism that is connected directly or indirectly to the crankshaft of the engine. Torque feedback control assembly 400 includes part of the shifting mechanism that is connected directly or indirectly to the load. An input/output planetary ratio assembly 200 transfers rotational motion from the input assembly 110 to the output assembly 120. In an embodiment, the input/output ratio assembly 200 is an input/output planetary assembly 200. The IVT 1100 changes the rotation input at the input assembly 110 to a rotational output at the output assembly 120 by a select ratio.

Figure 2A:
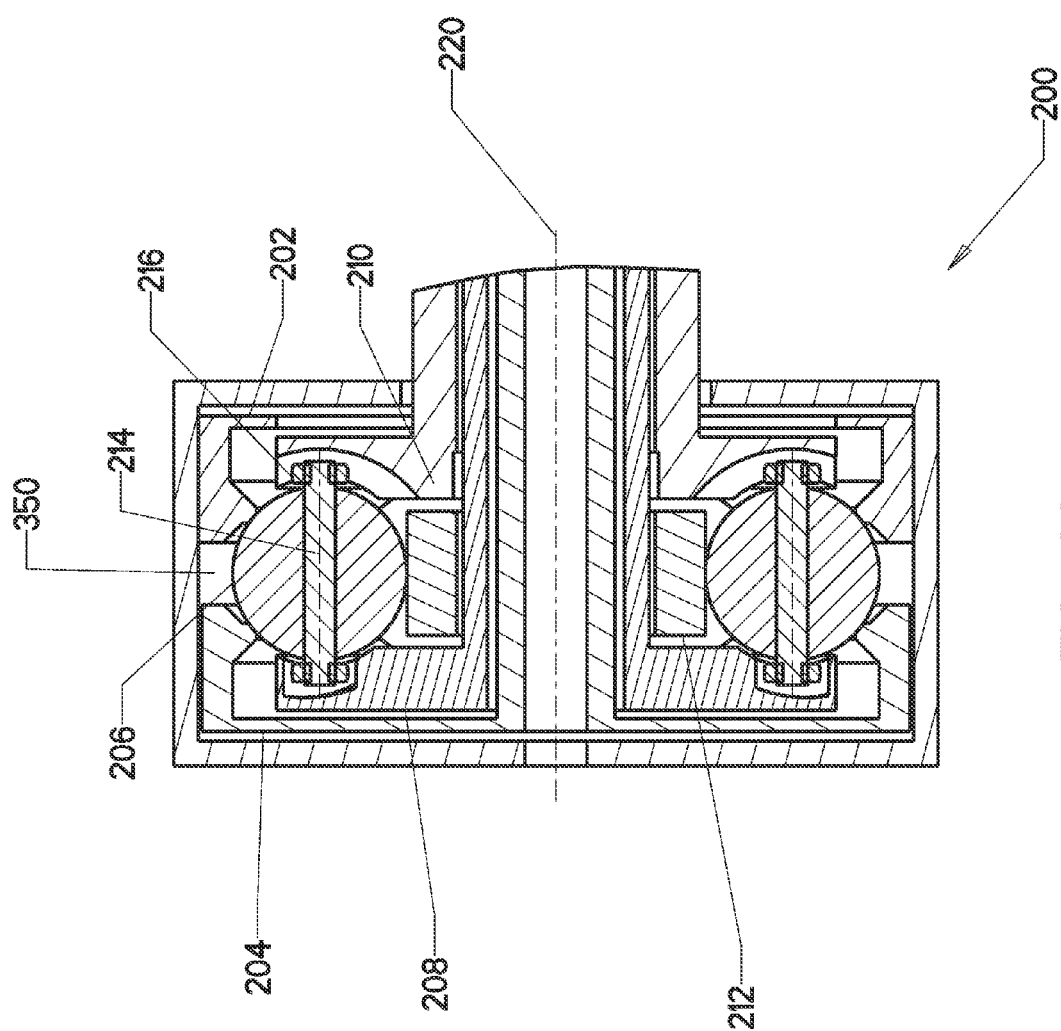
FIG. 2A is a cross-sectional side view of the input/output planetary ratio assembly of the IVT of FIG. 1.
Figure 2B:
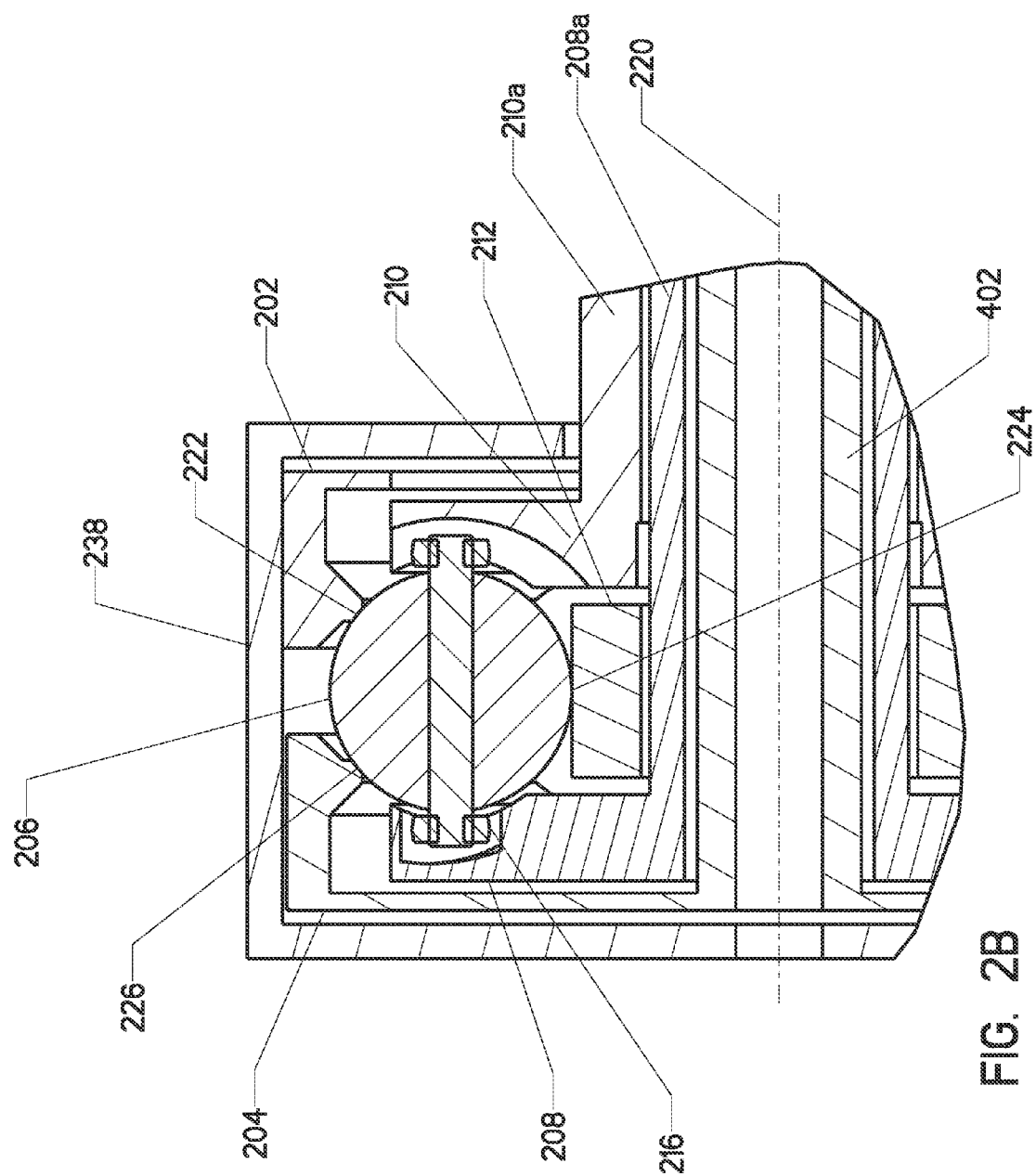
FIG. 2B is a cross-sectional side view of a portion of the input/output planetary ratio assembly of FIG. 2A.
Figure 3A:
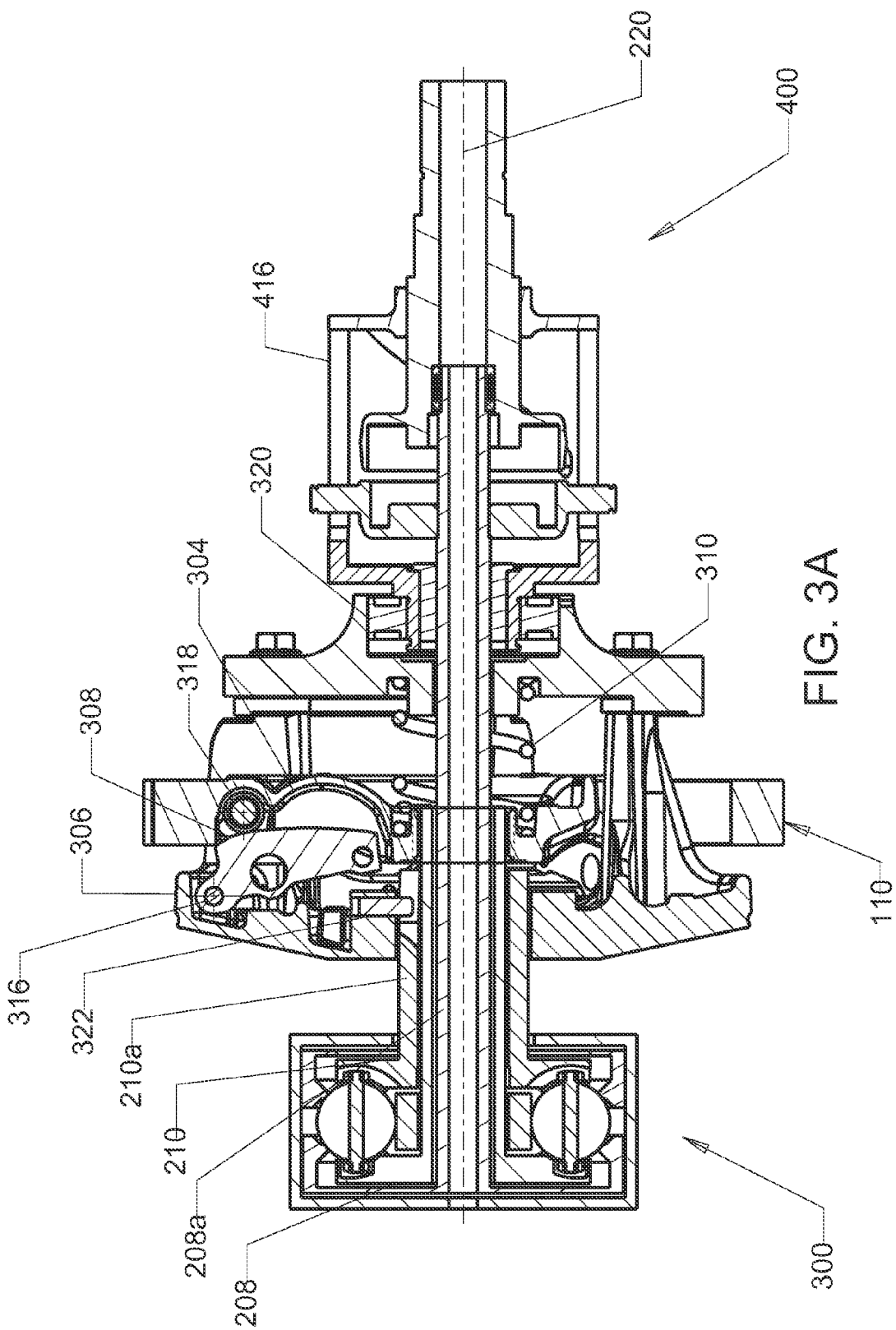
FIG. 3A is a cross-sectional side view of a input speed feedback control assembly of the IVT of FIG. 1.
Figure 3C:
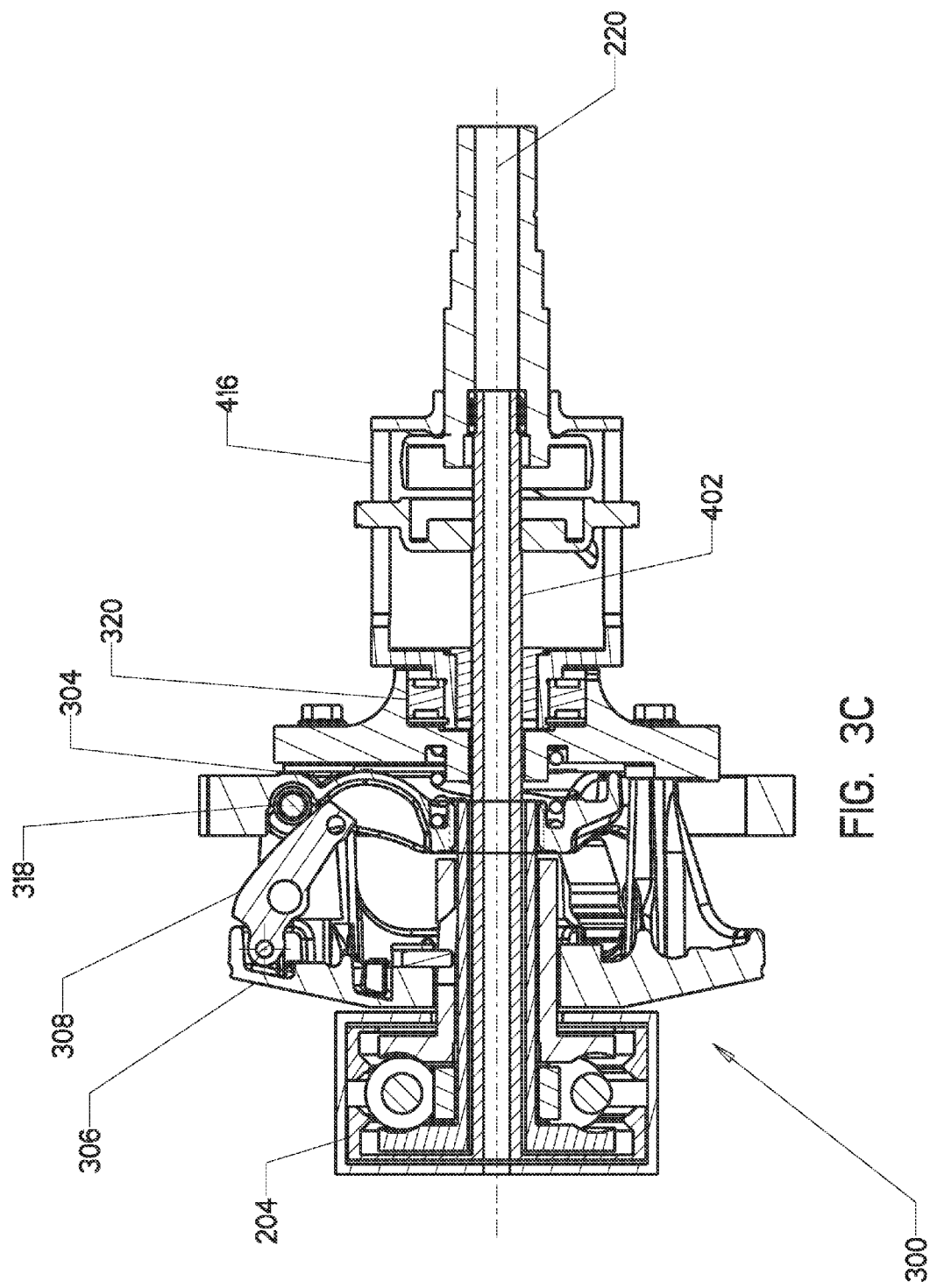
FIG. 3C is a cross-sectional side view of the input speed feedback control assembly of FIG. 3A positioned to provide a second high speed shift position.
Figure 3D:
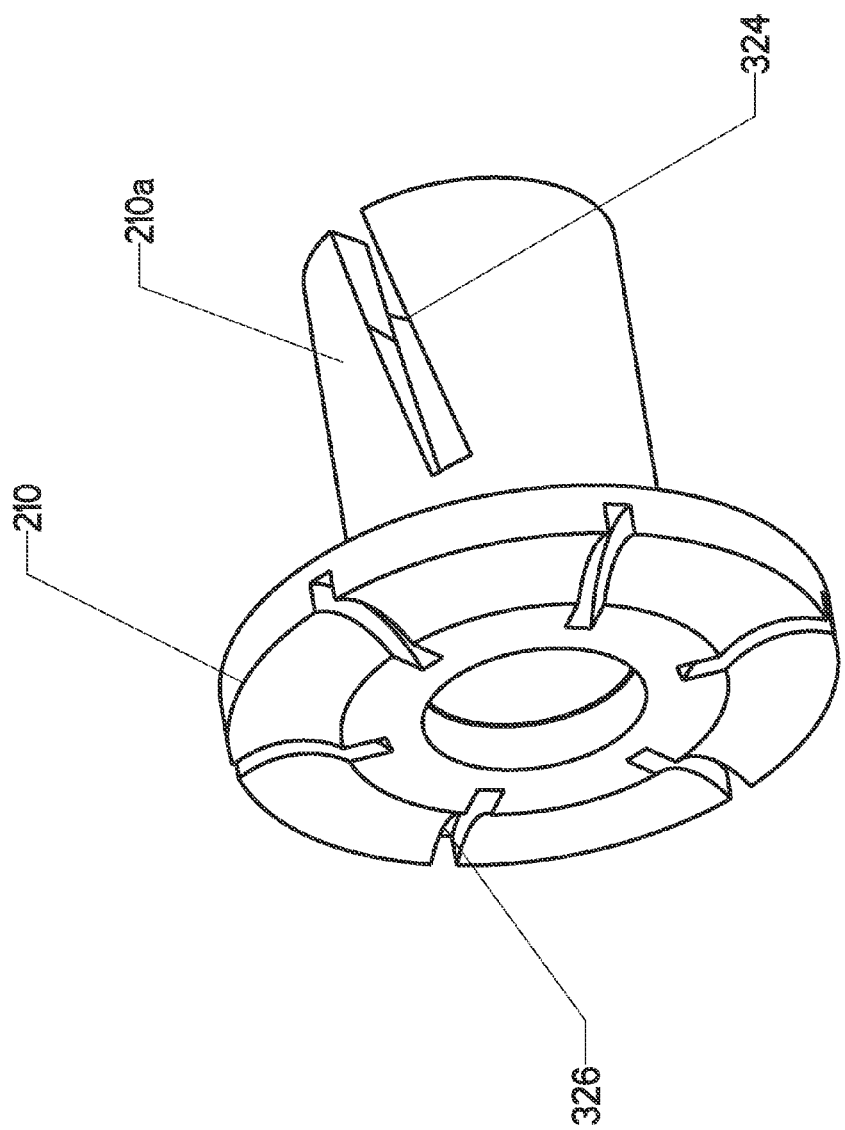
FIG. 3D is a perspective view of a second stator of the input/output planetary ratio assembly of FIG. 2B.

FIG. 2A illustrates the input/output planetary ratio assembly 200 of the IVT 1100. In FIG. 2A, torque comes into the input/output planetary ratio assembly 200 from the input assembly 110 via the input speed feedback control assembly 300 to the first stator 208 and second stator 210. The first and second stators control the location and angle of axle 214 and hence the axis 236 of the axle 214 of the planet 206. Planet 206 contacts the first traction ring 202 at contact point 222 as illustrated in the close up view provided in FIG. 2B. At contact point 224, the planet 206 contacts a sun 212 and spins the sun 212 about the axis 220 of the input/output planetary ratio assembly 200. The planet 206 contacts the second traction ring 204 at contact point 226. The input/output planetary ratio assembly 200 has a relatively large clamping load that clamps the two traction rings 202 and 204 together. The reaction force from this clamping load goes through the traction rings 202 and 204 into the planets 206 and eventually to the sun 212. With multiple planets 206 this load gets equalized about the axis 220 of the input/output planetary ratio assembly 200. The first traction ring 202 is operatively connected to the housing 238 as illustrated in the close up view provided in FIG. 2B. Both the first traction ring 202 and the housing 238 are fixed and do not rotate. Rollers (or bearings or caps) 216 are positioned on ends of axle 214. The rollers 216 fit in tracks 218 (best illustrated in FIG. 2C) in a first stator 208. FIG. 2C further illustrates a first stator shaft 208a that extends centrally from the first stator 208. A second stator 210 has similar tracks that the rollers 216 fit into but the tracks, in one embodiment, may or not be offset from the tracks in the first stator, 208. The second stator 210 is illustrated in FIG. 3D. As illustrated in FIG. 3D, a second stator shaft 210a centrally extends from the second stator 210. In embodiments, the first stator shaft 208a of the first stator 208 is received within the second stator shaft 210a of the second stator 210 as best illustrated in FIG. 3A. As the first stator 208 and second stator 210 rotate about the input/output assembly axis 220, rotation and torque are transmitted through tracks 218, through rollers 216, into axles 214 and into the planets 206. From this mechanism, the planets 206 individually spin about their axles 214 and as a group about the input/output assembly axis 220. Both of these stators are operatively connected to the input speed feedback control assembly 300 and rotate at essentially the same rate or RPM. However the second stator 210 can rotate relative to the first stator 208 within a certain range (typically fewer than 90°) while rotating at essentially the same rate or RPM. When the second stator 210 rotates relative to the first stator 208, the tracks 218 rotate relative to each other causing a phase change between the first 208 and second 210 stators. The planet axle 214 is restricted to follow the tracks 218 in the first stator 208 and the tracks 326 in the second stator 210. As the phase changes between the first stator 208 and the second stator 210, the axle will follow the tracks and will find anew equilibrium. Thus the angle of the axle 214 changes and the axle twists and tips relative to the X, Y, Z axis of the device changing the ratio of the IVT. How these two stators change phase between each other will be described below. The torque path of the IVT 1100 is from the input assembly 110, through the input speed feedback control assembly 300, to both the first 208 and second 210 stators, through the rollers 216 and axle 214, to the planets 206, to the second traction ring 204 through the cam mechanism 400 (described below) and eventually out of the device through the output assembly 120. Additionally, a reaction torque is generated through the second traction ring 202 to ground through the housing 238. Traction fluid 350 in the input/output planetary ratio assembly 200 along with the clamping load between the traction rings 202 and 204, planets 206 and sun 212 allows torque and RPM to be transmitted from the input assembly 110 to the output assembly 120. In an IVT, a geared neutral condition exists. A geared neutral condition occurs when the axle 214 is parallel to the input/output planetary ratio assembly axis 220. To help ensure accurately locating neutral, a detent system could be designed between the shafts of the first stator 208 and second stator 210. This detent system would help ensure that the device is as close to neutral as manufacturing tolerances on the affected parts allowed. This detent system could be a spring and ball in one stator and a drilled hole, cut slot, cut groove in the other stator. Many ways of making a detent mechanism such as this are known and would work in this design. In another embodiment, a separately geared planetary system before or after the input/output planetary ratio 200 could change the overall IVT 1100 system geared neutral angle of axle 214 from that shown in this embodiment to a different angle with the same effect.

Figure 2D:
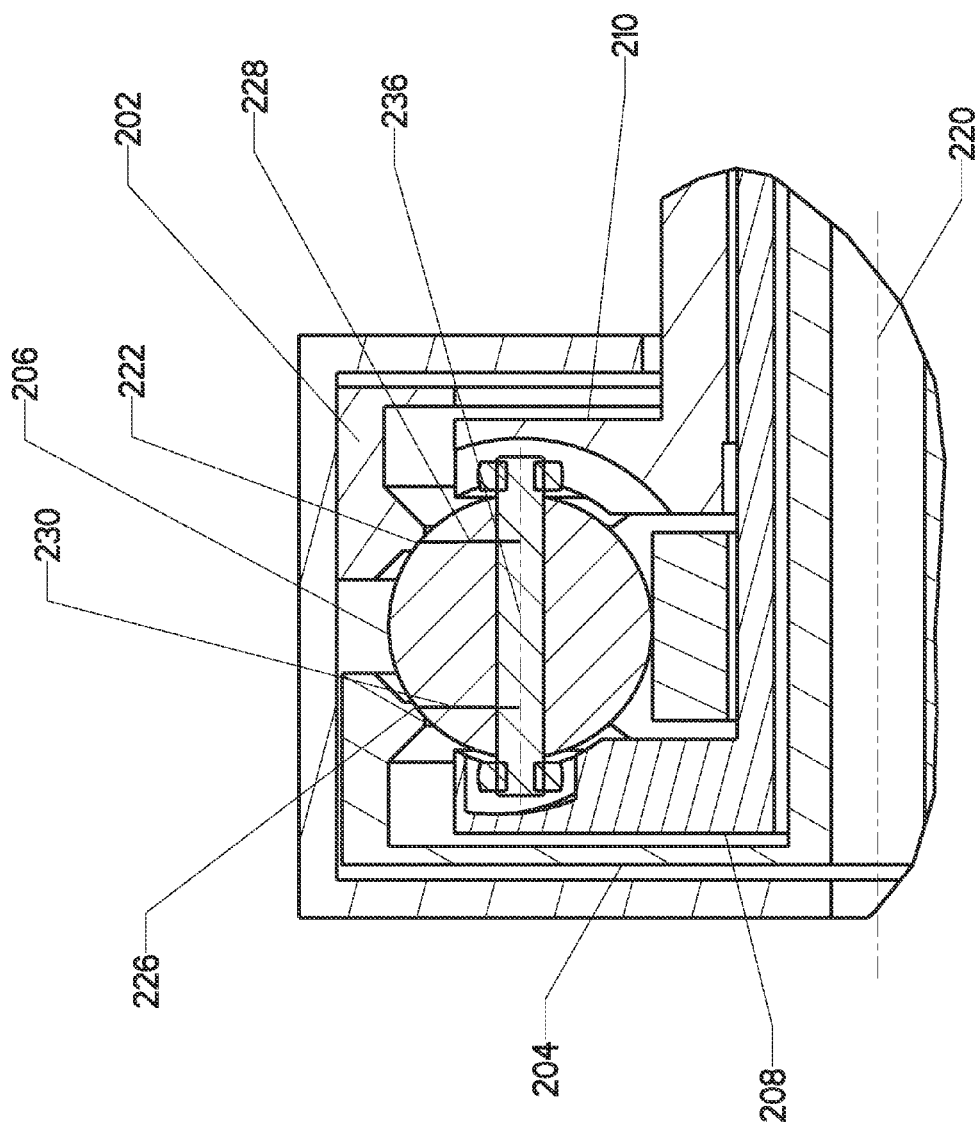
FIG. 2D is a cross-sectional side view of a portion of input/output planetary ratio assembly of FIG. 2A with an axle axis of the planets set to provide a first speed ratio.
Figure 2E:
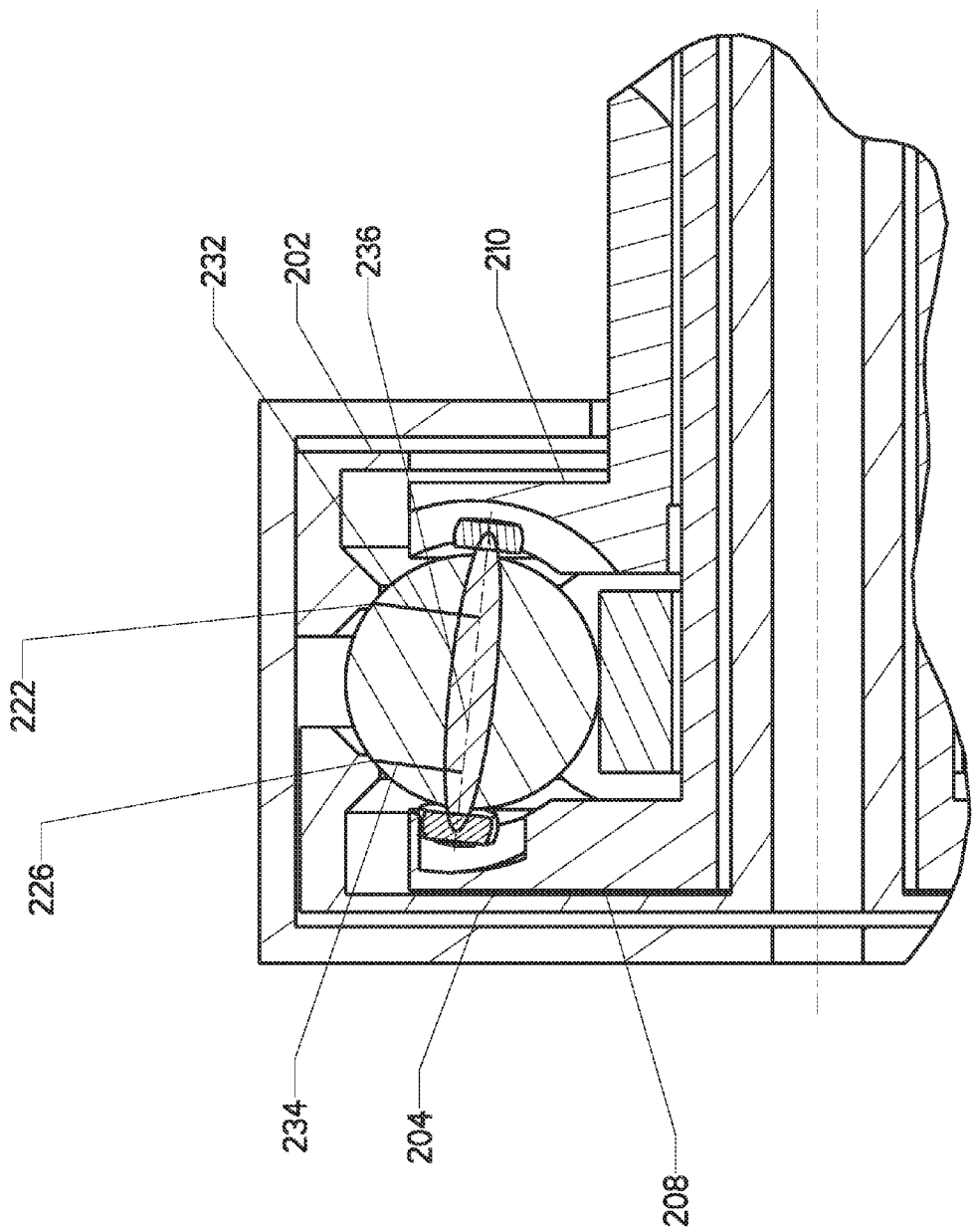
FIG. 2E is a cross-sectional side view of a portion of the input/output planetary ratio assembly of FIG. 2A with an axle axis of the planets set to provide a second speed ratio.

As discussed above, the IVT 1100 can change ratio from the input to the output. The ratio is calculated by the following formula (1−(input distance/output distance)). Referring to FIG. 2D, the input distance is 228 which is the distance from the contact point, 222 to the axis 236 of the axle 214. The output distance is 230 which is the distance from contact point 226 to the axis 236 of the axle 214. As shown in FIG. 2D, the device is in neutral when these distances are equal. Therefore, the second traction ring 204 will not rotate when the first 208 and second 210 stators are spinning. When the second stator 210 rotates relative to the first stator 208, the planet 206 and its axle 214 twist and tip in the X, Y, and Z planes as partially shown in simplified FIG. 2E. When this happens, the input distance 232 from contact point 222 to the axis 236 of the axle 214 gets longer and the output distance 234 from contact point 226 to the axis 236 of the axle 214 gets shorter causing a ratio change in input/output planetary ratio assembly 200. Rotating the second stator 210 in the opposite direction will give you a reverse condition with the planet 206 and its accompanying parts rotating such that 232 gets shorter and 234 gets longer and the second traction ring 204 will be rotating in the opposite direction and at a different rotational rate compared to the first 208 and second 210 stators.

A mechanism that controls the rotation between the first and second stators 208 and 210 is described below. Referring to FIG. 3A, input assembly 110 is an input to the input speed feedback control assembly 300. Input assembly 110 may be a shaft, gear, pulley or the like. Input assembly 110 can be operatively connected directly to an engine crankshaft, or be operatively connected to the engine through a starter clutch, torque convertor, torque dampener, gear set and the like. Input assembly 110 delivers rotational motion to the input speed feedback control assembly 300. In this embodiment, spider 304 is operatively attached to input member 110. Spider 304 includes pucks 312 (illustrated in FIG. 3B) that contact a tower 314 on a movable member 306. Moveable member 306 is rotationally connected to spider 304 but is slidably movable relative to spider 304. A shift weight 308 is pivotally attached to movable member 306 by pin 316. Pin 316 could be any fastener such as a pin or bolt. As the movable member 306 of the input speed feedback control assembly 300 spins with spider 304, the shift weight 308 spins about axis 220 of the input/output ratio assembly 200. The faster the movable member 306 spins, the more centrifugal force is asserted on the shift weight 308. The shift weight 308 is designed such that its center of gravity is above the pivot point of pin 316, so it imparts a force onto the roller 318, which is operatively connective to spider 304. The mechanics of the shift weight 308 to roller 318 creates an axial force along the X axis that will get transmitted through bearing 320 to torque feedback control assembly 400. The faster the input speed feedback control assembly portion 300 spins, the more axial force created by the shift weight 308. A plurality of shift weights, arranged about the axis 220, may also be utilized to the same effect. The input speed feedback control assembly 300 further includes a spring 310. The spring 310 is pre-loaded to a predetermined force. Its purpose is to bias the input speed feedback control assembly 300 towards an input/output planetary ratio assembly 200 ratio extreme. In practice, this is typically a "low ratio" or neutral ratio, which, for this embodiment, is shown in FIG. 3A. Additionally, it is noted that a spring pre-loaded to a pre-determined force may be placed in other locations in the IVT to the same effect. As the input speed feedback control assembly 300 spins faster, the shift weight 308 creates more axial force. In embodiment 1100, once this axial force gets higher than the spring 310 force, the movable member 306 starts to move towards the input/output planetary ratio assembly 200. The spider 304 is rigidly connected to the first stator 208 via the first stator shaft 208a. Pin 322 is connected to movable member 306. Movable member 306 is operatively connected to the second stator 210 through pin 322 and a curved track 324 in the second stator shaft 210a best shown in FIGS. 3A and 3D. Movable member 306 can be operatively connected to the second stator 210 in other methods such as a screw thread, cam follower, pin and roller, cam etc. As movable member 306 moves away from spider 304, pin 322 and hence member 306 follow the track 324 in second stator 210. Because movable member 306 is rotationally connected to spider 304 but slidably movable relative to spider 304 it stays in phase with spider 304 as it moves away from spider 304. Due to the connection between movable member 306 and spider 304 and the helical/curved track 324 in the second stator 210, the second stator 210 rotates relative to the first stator 208 causing a phase change between the first stator 208 and the second stator 210 as the distance between movable member 306 and spider 304 changes. As previously explained, a change in phase between first stator 208 and second stator 210 results in a change in the angle of axle 214 and thus a change in the input/output ratio assembly 200 of the IVT into a different ratio. FIG. 3C depicts the input speed feedback control assembly 300 in "high ratio." An additional embodiment has a curved track in the towers 314 of movable member 306 and a straight slot in place of the curved track 324 in the second stator 210. Additionally, member 306 could be operatively connected to input member 110 and fixed to a stator with spider 304 rotationally fixed to member 306 and slidably moveable to 306 with a pin connecting spider 304 to a helical track in a stator.

In an additional embodiment, shift-weights that travel radially between the spider and the movable member produce a centrifugal radial force as a function of input rotational speed that is transformed into an axial force as a result of the angles of contact between the shift-weights and the spider and movable member. In yet another embodiment a generator output such as a magneto electrically operatively connected to an electromagnetic actuator such as a DC motor or solenoid exerts an axial force in opposing direction to the torque feedback control assembly. In yet another embodiment an electronic proximity sensor such as a hall-effect, reed, variable reluctance can be interfaced with a microprocessor to detect and calculate input shaft rotational rate and deliver an electrical power signal to an electrically controlled actuator. This electrical power signal may be a linear or non-linear function of input shaft rotational rate. The algorithm may also be a function of atmospheric barometric pressure in order to compensate for engine power output changes that occur as a result of altitude changes. An electrically controlled actuator may apply an axial force directly or indirectly to the torque feedback control assembly or may control a valve in a hydraulic circuit that regulates the hydraulic pressure and thus control the axial force. An electrically controlled actuator may apply piston hydraulic pressure that is in communication with a piston that may exert an axial force in opposing direction to the torque feedback control assembly. A hydraulic pump, driven at a rotational rate proportional to the input shaft assembly 110, that is in communication with a piston and valve may exert an axial force in opposing direction to the torque feedback control assembly.

Figure 4A:
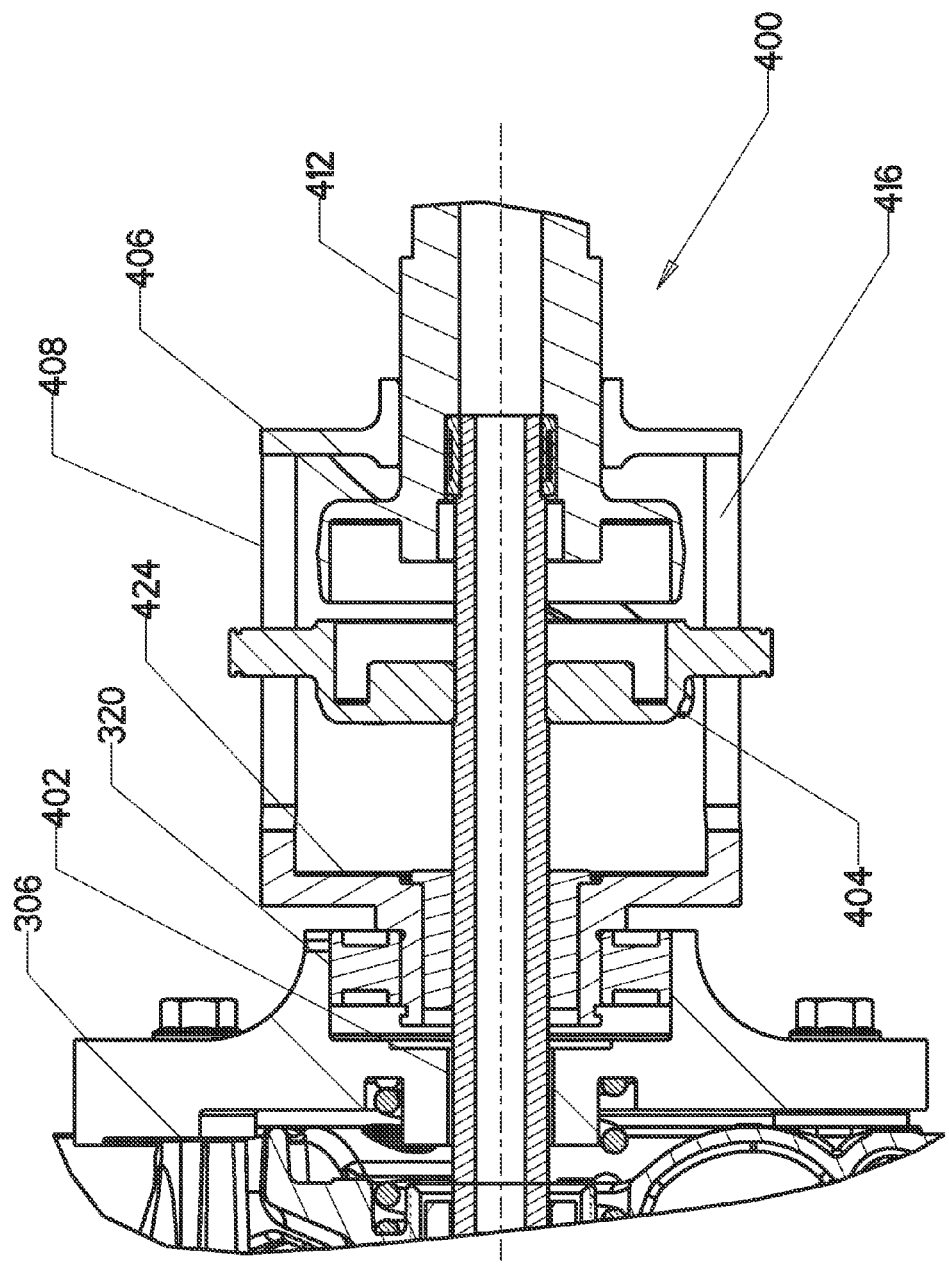
FIG. 4A is a cross-sectional side view of the torque feedback control assembly of the IVT of FIG. 1.
Figure 4B:
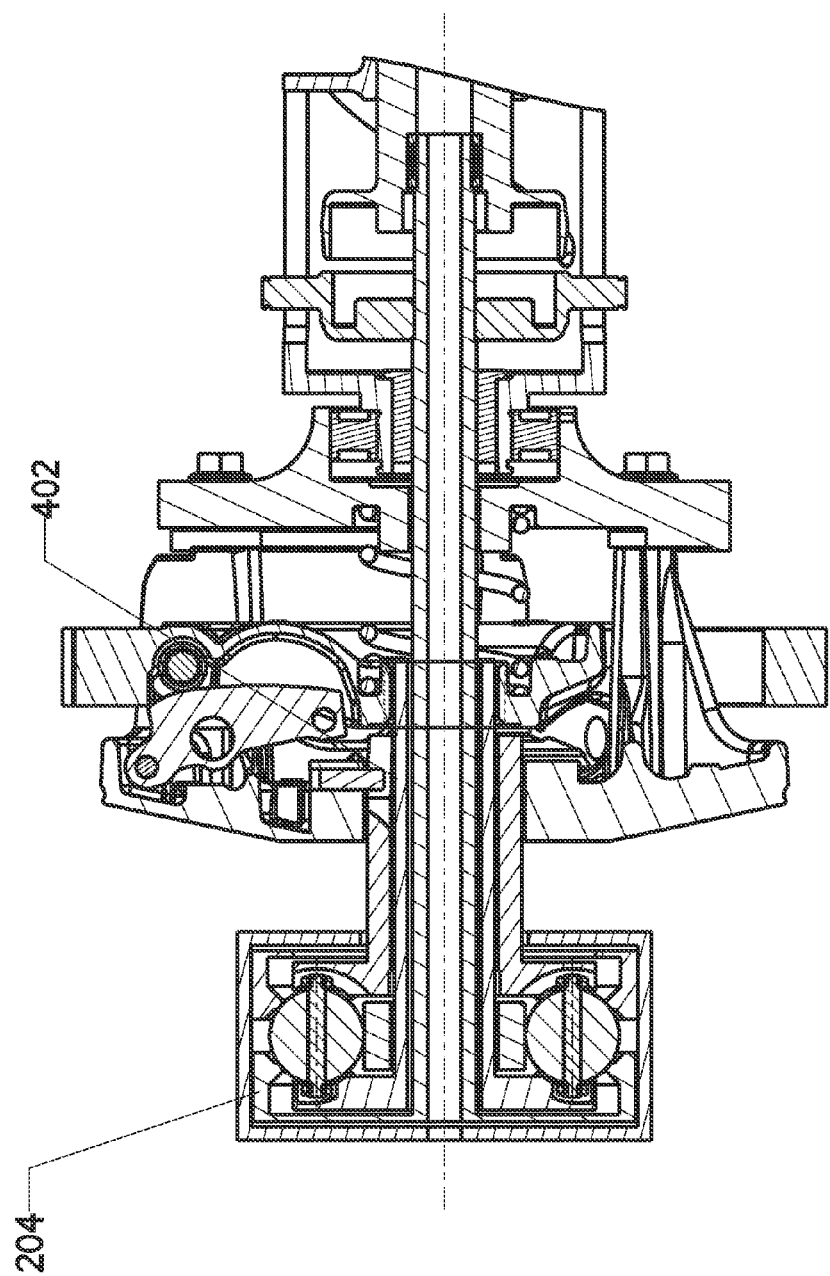
FIG. 4B is a cross-sectional side view of a portion of the torque feedback control assembly of FIG. 4A.
Figure 4C:
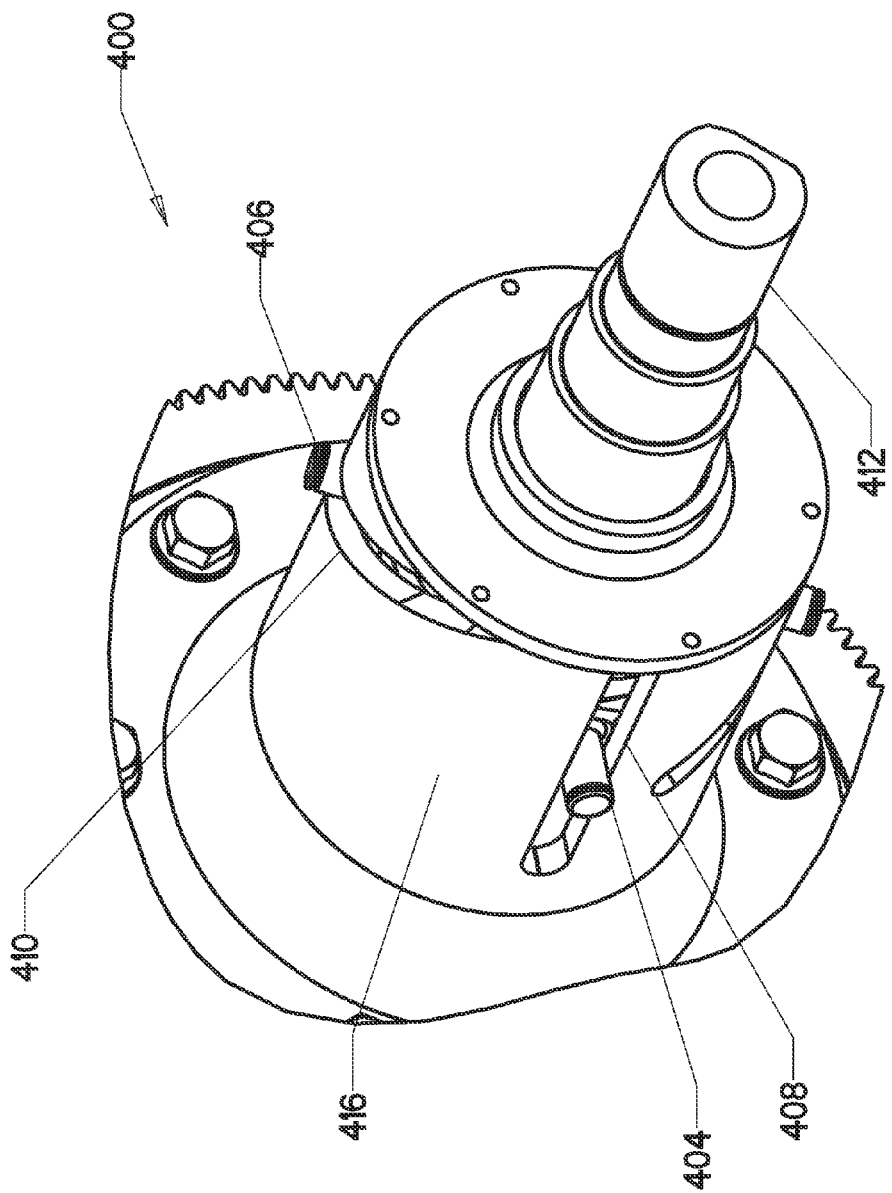
FIG. 4C is a perspective view of the torque feedback control assembly of FIG. 4A.

An input/output ratio shaft 402 is the output shaft from the input/output planetary ratio assembly 200. The input/output ratio shaft 402 is operatively connected to a second traction ring 204 as best illustrated in FIG. 4B. The input/output ratio shaft 402 transmits torque and rotational motion into the torque feedback control assembly 400 as illustrated in FIG. 4A. The purpose of the torque feedback control assembly 400 is to transmit torque and using this vehicle torque, create a proportional axial, X, force to back into the input speed feedback control assembly 300. The input/output ratio shaft 402 is operatively connected to the first spider 404. This first spider 404 transmits torque to a straight (or generally straight) set of first cam tracks 408 in cam 416 as best illustrated in FIG. 4C. The torque and rotational motion are then in the cam 416 of the torque feedback control assembly 400. This torque and rotational motion then go to a set of second helical tracks 410 and to a second spider 406. Because the first set of tracks 408 are straight in the cam 416, there is little to no axial, X, force. Because of the helical nature of the second set of tracks 410 in the cam 416, an axial, X, force is created in the contact area with the second spider 406 as torque is transferred from the cam 416 to the second spider 406 through the helical set of second tracks 410. Therefore the lower the torque load from the vehicle, the lower the axial force created by the torque feedback control assembly 400 and the higher the torque load from the vehicle, the higher the axial force created by the torque feedback control assembly 400. The torque and rotational motion transfer from the second spider 406 into the output shaft 412. Output shaft 412 is operatively connected to the load, such as the tires of a vehicle. Forces between the input speed feedback control assembly 300 and torque feedback control assembly 400 balance at a unique axial location for any given combination of input speed and output torque resulting in a unique phase relationship between the first 208 and second 210 stators resulting in a unique ratio for each input speed and output torque combination. If there is relatively high engine speed, the input speed feedback control assembly 300 spins at a relatively high rotational motion creating relatively high axial force. If there is low vehicle torque, the torque feedback control assembly 400 has relatively low axial force and the mechanism wants to shift into a higher ratio meaning the vehicle will go relatively faster. Additionally, rollers could be put on the spider pins 414 to reduce friction.

The preferred embodiment has been shown and described above. An additional embodiment interchanges the first and second spider functions. In this embodiment, the first spider 404 runs in the helix set of tracks 410 and the second spider 406 runs in the straight set of tracks 408. Moreover, other ways of accomplishing the functions of the cam and spider functions are contemplated such as having a cut track in a shaft with a cam follower connected to the cam. Another example is with the use of a straight spline on the shaft with a mating spline on the cam itself. The forces from the input speed feedback control assembly 300 and torque feedback control assembly, 400 can be reversed so the input speed feedback control assembly 300 pushes against the torque feedback control assembly 400 and the torque feedback control assembly 400 pushes back against the input speed feedback control assembly 300. Moreover, additional embodiments include using splines, screw threads, face cams, ball-ramp cams or tracks cut into the operative shafts along with cam followers, mating splines, mating threads to realize the function of the spiders and straight and helical tracks previously described. In addition, track 408 can be cut at an angle such that the axial, X, force is adequate for proper function.

Figure 5:
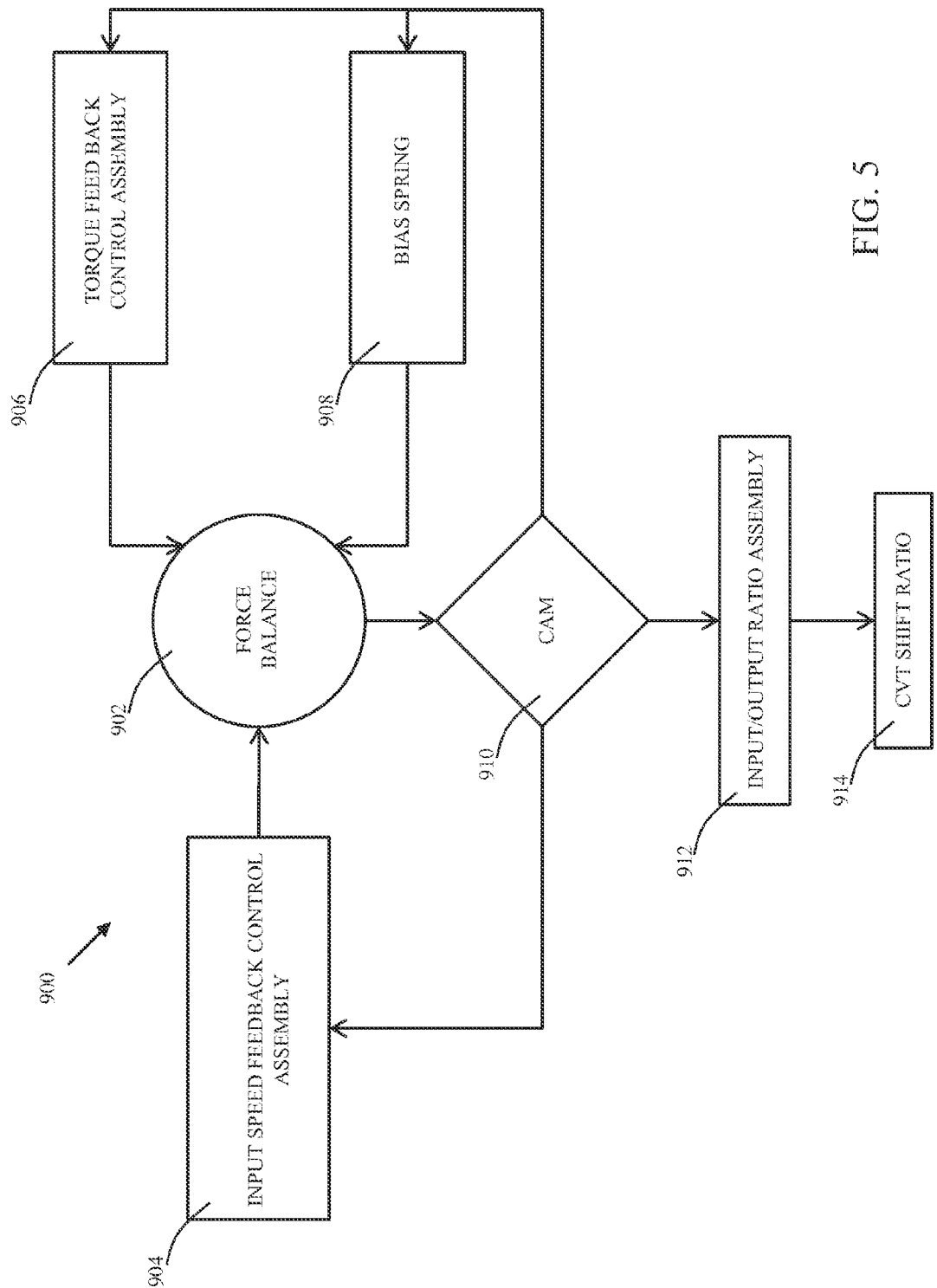
FIG. 5 is a functional block diagram of the IVT in FIG. 1.

FIG. 5 is a functional block diagram 900 of the present invention. Input speed feedback control assembly 904 produces a translational force as a linear or non-linear function of input shaft 110 rotational rate and as a constant, linear or non-linear function of translational position. Torque feedback control assembly 906 produces a translational force as a linear or non-linear function of output shaft 120 torque and as a constant, linear or non-linear function of translational position. Bias spring 908 produces a force as a constant, linear, or non-linear function of translational position. Translational force balance 902 outputs a translational position of cam 910 in accordance with the following equation:

Input Speed Feedback Control Assembly Force[Input Assembly 110 Rotational Speed, Translational Position]−Torque Feedback Control Assembly Force[Output Assembly 120 Torque, Translational Position]−Bias Spring Force[Translational Position]=0.

The input speed feedback control assembly 904, the torque feedback control assembly 906, the bias spring 908 and the cam 910 are translationally operatively connected. The translational position of cam 910 dictates the phase relationship of the first and second stators of an input/output planetary ratio assembly 912 that in turn dictates a specific shift ratio of a CVT 914.

In summary, as the force balance of the input speed feedback control assembly 300 and torque feedback control assembly 400 balance at a particular axial location, the second stator 210 will correspond and rotate relative to the first stator 208 changing the ratio of the input/output planetary ratio assembly 200. The first 208 and second 210 stator functions are interchanged in another embodiment. With the change in phase between these two stators, the IVT 1100 changes ratio. In embodiments, shifting of the IVT 1100 is accomplished with an input speed feedback control assembly 300 that uses rotational motion from an engine or other input to create an axial force that force balances with a torque feedback control assembly 400 that is operatively connected to the torque load, such as the tires of a vehicle. This shifting design has applications to other transmission devices such as a Continuously Variable Transmission (CVT) of similar designs as well as an IVT system where the input and output are both coaxial to the IVT 1100 and on the same side of the IVT 1100.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. An infinitely variable transmission comprising:
   an input assembly configured to be coupled to receive input rotational motion;
   an output assembly to provide a rotational output, the output assembly configured to be rotationally coupled to a load;
   an input/output planetary ratio assembly configured and arranged to set an input to output speed ratio, the input/output planetary ratio assembly having a first stator and a second stator;
   an input speed feedback control assembly operationally attached to the input assembly, the input speed feedback control assembly including,
      a spider coupled to one of the first stator and the second stator, and
      a movable member operationally engaged with the spider with at least one shift weight, the moveable member further operationally coupled to the other of the first stator and second stator, and
   a torque feedback control assembly configured and arranged to apply an axial load force in response to a torque of a load to the input speed control assembly.

2. The infinitely variable transmission of claim 1, further comprising:

a first stator shaft centrally extending from the first stator, the first shaft rigidly coupled to the spider; and a second stator shaft centrally extending from the second stator, the second shaft having a track, the first shaft received within the second shaft.

3. The infinitely variable transmission of claim 2, further comprising:

a pin coupled to the movable member, the pin received within the track in the second stator shaft.

4. The infinitely variable transmission of claim 2, wherein the track in the second stator shaft is curved.

5. The infinitely variable transmission of claim 2, wherein the track in the second stator shaft is helical.

6. The infinitely variable transmission of claim 2, wherein the input/output planetary ratio assembly further comprises:

the first stator having a first disk portion with a plurality of first tracks, the first shaft centrally extending from the first disk portion;

the second stator having a second disk portion with a plurality of second tracks, the second shaft extending centrally from the second disk portion;

an axle extending through an axis of each planet, rollers coupled to first and second ends of each axle, the first end of each axle received in one of the first tracks of the first stator and the second end of each axle received in one of the second tracks of the second stator, and a plurality of planets movably engaged between the first and second stator, the input output ratio based on a rotation of the second stator and the first stator in relation to each other.

7. The infinitely variable transmission of claim 1, wherein the torque feedback control assembly further comprises:

an input/output ratio shaft operationally coupled to input/output ratio assembly;

a cam slidably mounted on the input/output ratio shaft, the cam in operational communication with the movable member of the input speed feedback control assembly, the cam having a first set of tracks and a second set of tracks, the second set of tracks being in a non-parallel configured in relation to the first set of tracks;

a first cam spider, the first cam spider operationally connected to the input/output ratio output shaft, at least a portion of the first cam spider received in a first set of tracks of the cam, the first cam spider transmitting torque to the cam via the at least a portion of the first cam spider in the first set of tracks; and a second cam spider, the second cam spider operationally connected to an output shaft of the output assembly, at least a portion of the second cam spider received in a second set of tracks, wherein the second cam spider rotates relative to the first spider which operates in the first set of tracks causing a phase change between first and second spiders when a change in axial position of the torque feedback control assembly occurs.

8. The infinitely variable transmission of claim 7, wherein the first set of tracks are straight and the second set of tracks are helical.

9. The infinitely variable transmission of claim 7, wherein the first set of tracks are helical and the second set of tracks are straight.

10. The infinitely variable transmission of claim 7, wherein the first set of tracks a helical and the second set of tracks are helical.

11. An infinitely variable transmission comprising:

an input assembly configured to be coupled to receive input rotational motion;

an output assembly to provide a rotational output, the output assembly configured to be rotationally coupled to a load;

an input/output planetary ratio assembly configured and arranged to set an input to output speed ratio, the input/output planetary ratio assembly having a first stator and a second stator, a first stator shaft centrally extending from the first stator and a second stator shaft centrally extending from the second stator, the second shaft having a track, the first shaft received within the second shaft;

an input speed feedback control assembly operationally attached to the input assembly, the input speed feedback control assembly including, a spider, the first shaft of the first stator rigidly coupled to the spider and a movable member operationally engaged with the spider with at least one shift weight, a pin coupled to the movable member, the pin received within the track in the second stator shaft.

12. The infinitely variable transmission of claim 11, further comprising:

a torque feedback control assembly configured and arranged to apply an axial load force in response to a torque of a load to the input speed control assembly.

13. The infinitely variable transmission of claim 12, wherein the torque feedback control assembly further comprises:

an input/output ratio shaft operationally coupled to input/output ratio assembly;

a cam slidably mounted on the input/output ratio shaft, the cam in operational communication with the movable member of the input speed feedback control assembly, the cam having a first set of tracks and a second set of tracks, the second set of tracks being in a non-parallel configured in relation to the first set of tracks;

a first cam spider, the first cam spider operationally connected to the input/output ratio output shaft, at least a portion of the first cam spider received in a first set of tracks of the cam, the first cam spider transmitting torque to the cam via the at least a portion of the first cam spider in the first set of tracks; and a second cam spider, the second cam spider operationally connected to an output shaft of the output assembly, at least a portion of the second cam spider received in a second set of tracks, wherein the second cam spider rotates relative to the first spider which operates in the first set of tracks causing a phase change between first and second spiders when a change in axial position of the torque feedback control assembly occurs.

14. The infinitely variable transmission of claim 11, wherein the track in the second stator shaft is one of curved and helical form.

15. The infinitely variable transmission of claim 11, wherein the input/output planetary ratio assembly further comprises:

the first stator having a first disk portion with a plurality of first tracks, the first shaft centrally extending from the first disk portion;

the second stator having a second disk portion with a plurality of second tracks, the second shaft extending centrally from the second disk portion;

an axle extending through an axis of each planet;

rollers coupled to first and second ends of each axle, the first end of each axle received in one of the first tracks of the first stator and the second end of each axle received in one of the second tracks of the second stator; and a plurality of planets movably engaged between the first and second stator, the input output ratio based on a rotation of the second stator and the first stator in relation to each other.

16. An infinitely variable transmission comprising:
- an input assembly configured to be coupled to receive input rotational motion;
- an output assembly to provide a rotational output, the output assembly configured to be rotationally coupled to a load;
- an input/output planetary ratio assembly configured and arranged to set an input to output speed ratio, the input/output planetary ratio assembly having a first stator and a second stator, a first stator shaft centrally extending from the first stator and a second stator shaft centrally extending from the second stator, the second shaft having a track, the first shaft received within the second shaft;
- an input speed feedback control assembly operationally attached to the input assembly, the input speed feedback control assembly including,
  - a spider, the first shaft of the first stator rigidly coupled to the spider, and
  - a movable member operationally engaged with the spider with at least one shift weight, a pin coupled to the movable member, the pin received within the track in the second stator shaft, and
- a torque feedback control assembly configured and arranged to apply an axial load force in response to a torque of a load to the input speed control assembly.

17. The infinitely variable transmission of claim 16, wherein the track in the second stator shaft is curved.

18. The infinitely variable transmission of claim 16, wherein the track in the second stator shaft is helical.

19. The infinitely variable transmission of claim 16, wherein the input/output planetary ratio assembly further comprises:
- the first stator having a first disk portion with a plurality of first tracks, the first shaft centrally extending from the first disk portion;
- the second stator having a second disk portion with a plurality of second tracks, the second shaft extending centrally from the second disk portion;
- an axle extending through an axis of each planet;
- rollers coupled to first and second ends of each axle, the first end of each axle received in one of the first tracks of the first stator and the second end of each axle received in one of the second tracks of the second stator; and
- a plurality of planets movably engaged between the first and second stator, the input output ratio based on a rotation of the second stator and the first stator in relation to each other.

20. The infinitely variable transmission of claim 16, wherein the torque feedback control assembly further comprises:
- an input/output ratio shaft operationally coupled to input/output ratio assembly;
- a cam slidably mounted on the input/output ratio shaft, the cam in operational communication with the movable member of the input speed feedback control assembly, the cam having a first set of tracks and a second set of tracks, the second set of tracks being in a non-parallel configured in relation to the first set of tracks;
- a first cam spider, the first cam spider operationally connected to the input/output ratio output shaft, at least a portion of the first cam spider received in a first set of tracks of the cam, the first cam spider transmitting torque to the cam via the at least a portion of the first cam spider in the first set of tracks; and
- a second cam spider, the second cam spider operationally connected to an output shaft of the output assembly, at least a portion of the second cam spider received in a second set of tracks, wherein the second cam spider rotates relative to the first spider which operates in the first set of tracks causing a phase change between first and second spiders when a change in axial position of the torque feedback control assembly occurs.

\* \* \* \* \*